Oct. 31, 1967 — F. L. MAGOON — 3,349,639

VALVE CONTROL MECHANISM

Filed Aug. 23, 1965 — 2 Sheets-Sheet 1

INVENTOR.
FRED L. MAGOON
BY
Fishburn and Holt
ATTORNEYS

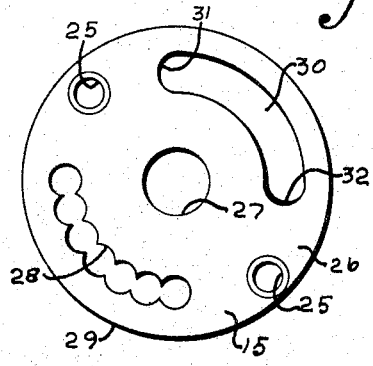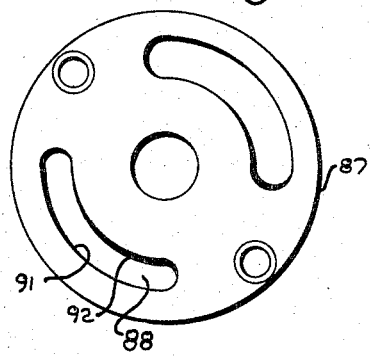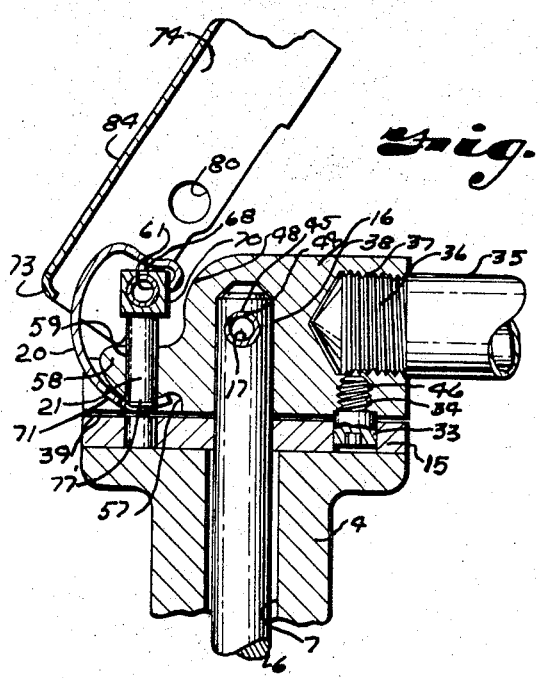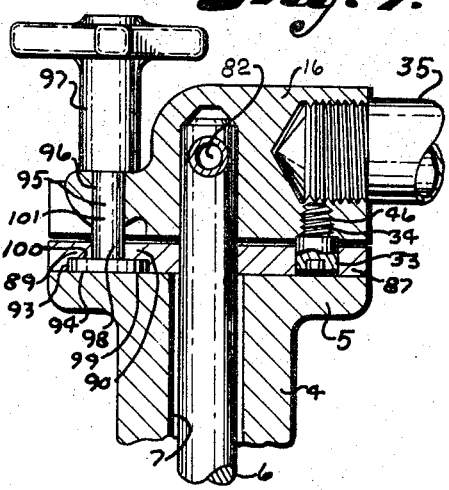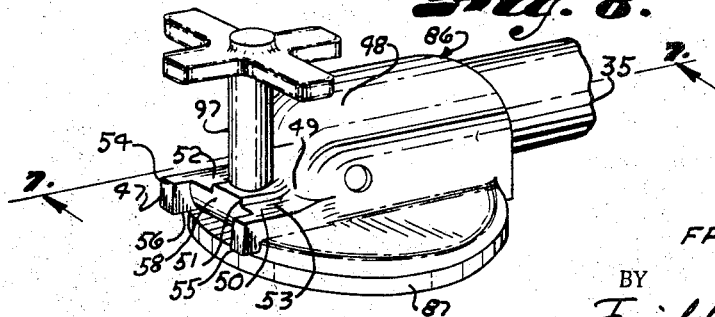

United States Patent Office 3,349,639
Patented Oct. 31, 1967

3,349,639
VALVE CONTROL MECHANISM
Fred L. Magoon, Oklahoma City, Okla., assignor to Demco, Incorporated, a corporation of Oklahoma
Filed Aug. 23, 1965, Ser. No. 481,710
15 Claims. (Cl. 74—527)

ABSTRACT OF THE DISCLOSURE

This invention discloses a control mechanism for butterfly valves and the like, and includes a body within which a valve member is rotated, the body being secured to a conduit through mating flanges and bolts. It includes a hub member extending from one side of the body having a shaft extending through the body upon which the valve closure member is mounted and through the hub, and to which is connected a handle member for rotation of the shaft with the valve member thereon to open and close the valve. The handle portion includes locking means for locking the valve in the desired position in the body.

---

This invention relates to a valve and more particularly, to a valve control mechanism.

The principal objects of this invention are: to provide a valve having an axially rotatable control shaft secured to a valve member with a control mechanism on the valve casing for rotating said control shaft and valve member through a desired arc of rotation and to lock said shaft and valve member in a desired position within said arc to provide a positive lock and prevent displacement of the valve member; to provide a valve control mechanism for use in association with a valve casing to rotate a valve control shaft and valve member through a desired arc of rotation and having a locking mechanism to secure the valve control shaft and valve member in various positions within said arc of rotation; to provide a simple and inexpensive means for locking the valve control shaft and valve member in a certain position and against accidental displacement without the necessity of locking keys; to provide a valve control mechanism for rotation of a control shaft having a hub and a spring loaded locking device wherein the hub absorbs the reactive force of the spring and the control shaft is not subjected to the load imposed by the activation of the spring when unlocking said mechanism; to provide a valve control mechanism with a locking device comprised of a throttle plate and a pin which are enclosed within the mechanism and protected from weathering unlike conventional teeth and latch locking devices, thus preventing malfunction of the device due to dirty, rusted or otherwise contaminated elements in the locking device; to provide a valve control mechanism with terminal stops enclosed within the mechanism and protected from weathering unlike conventional exposed terminal stops; to provide a valve control mechanism wherein a flat C-shaped spring is utilized with said spring acting to close the end of the latch mechanism and to occupy a minimum of space in comparison to more conventional coil springs which might be disposed in counterbores; to provide a valve control mechanism with a locking device which may be simply and inexpensively constructed and secured to the conventional valve housing.

Other principal objects of this invention are: to provide a valve control mechanism which may be readily adapted to infinite throttling service by provision of a device which allows locking of the valve control mechanism in any rotational position along the arc of rotation of the control shaft; to provide a valve control mechanism for connection to a valve neck flange of a valve casing being comprised of a throttle plate secured to the valve neck flange, a hub in overlying spaced relation to the throttle plate having an opening therein for receipt of the valve control shaft, a means in said opening for connecting the control shaft to the hub and a locking device on said hub being comprised of a locking pin extended through an opening in said hub and into an aligned series of openings in the throttle plate beneath said hub, a lever latch secured to the locking pin with a cam surface adjacent the hub and a spring connected to both the hub and the upper portion of the locking pin which upon rotation of the lever latch cams the locking pin out of engagement with the throttle plate, thus releasing the hub from a locked position enabling the hub to be rotated, thus rotating the control shaft and valve member or vane to a new desired position.

Other objects and advantages of this invention will become apparent from the following description taken in connection with the accompanying drawings wherein are set forth by way of illustration and example certain embodiments of this invention.

FIG. 4 is a view similar to FIG. 2 with the lever latch rotated upwardly and the locking pin disengaged from the throttle plate, thus unlocking the valve control mechanism.

FIG. 5 is a plan view of the throttle plate.

FIG. 6 is a plan view of a modified form of the throttle plate which provides infinite throttling service.

FIG. 7 is a vertical cross-sectional view taken along lines 7—7 in FIG. 8 showing a modified form of the valve control mechanism which provides infinite throttling service.

FIG. 8 is a perspective view of the modified form of the valve control mechanism which provides infinite throttling service.

Figure 1:
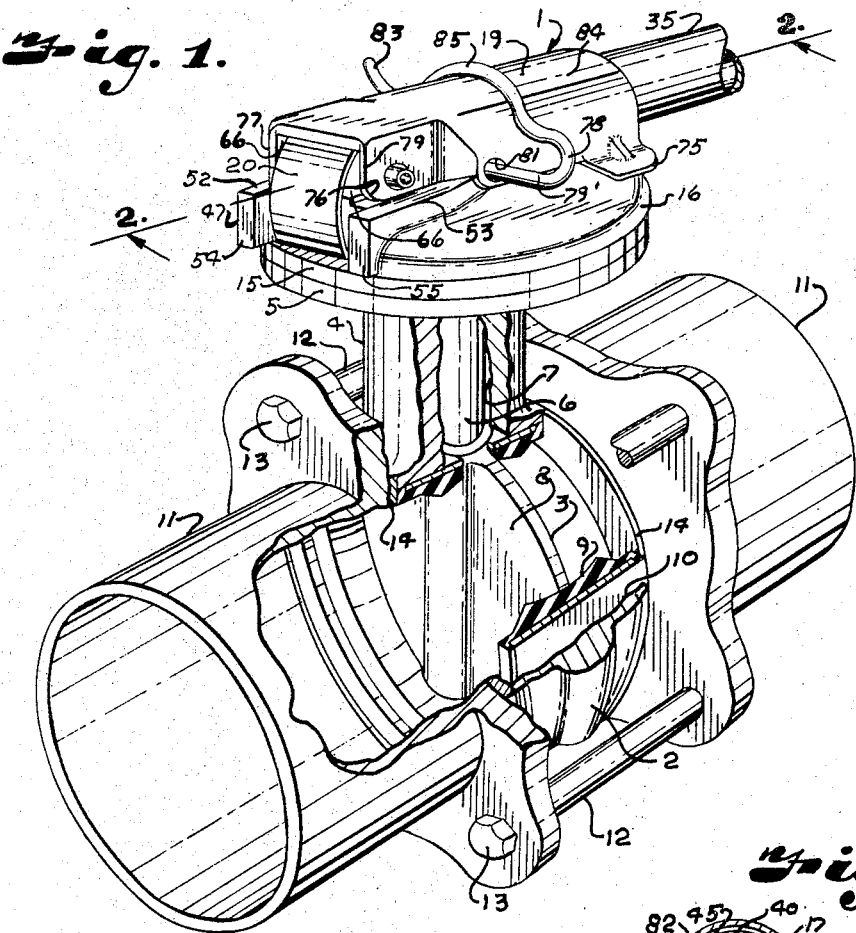
FIG. 1 is a perspective view of the valve control mechanism showing said mechanism secured to the neck flange of a valve in a section of piping with a portion of said pipe and neck broken away showing the valve stem or control shaft and butterfly disc in said pipe.

Referring to the drawings in more detail:

The reference numeral 1 refers generally to a valve control mechanism embodying the features of this invention. As illustrated, the valve control mechanism 1 is shown mounted on a valve casing or housing 2 mounted in a flow structure, said control mechanism being operatively connected to a valve member 3 such as a butterfly valve housed within the valve casing or housing section 2. A valve neck 4 extends outwardly from the casing section 2 terminating at its outward end in a valve neck flange 5. An axially rotatable valve stem or valve control shaft 6 extends outwardly from the housing section 2 through an interior through bore 7 substantially axially in the valve neck 4. The valve stem 6, as illustrated, is secured to a butterfly vane or disc 8 within housing section 2 which is shown in FIG. 1 in an off position closing the flow passage in the casing 2 and preventing the flow of liquid in the piping system. The butterfly disc 8 is shown within a resilient lining or sealing seat 9 which is adhered to the interior surface 10 of valve housing section 2 to provide a tight seal between the valve housing section 2 and the butterfly disc 8 to prevent leakage about said butterfly disc 8.

The valve housing section 2 is connected within the flow structure between pipe ends 11 in a conventional manner by bolts 12 with bolt heads 13, with gaskets 14 disposed between the housing section 2 and pipe ends 11.

The valve control mechanism is secured to the valve neck flange 5 and the valve stem 6 and is utilized to rotate the valve stem 6 and thus the butterfly disc 8 to a desired angular position within the valve housing section 2 and to lock said disc 8 and valve stem 6 in that desired position.

The valve control mechanism 1 is comprised of a throttle plate 15, a hub 16, a means to secure the valve stem 6 in the hub 16, here illustrated as a hollow pin 17, and a locking device 18 comprised of a lever latch 19, a spring 20 and a locking pin 21.

Figure 3:
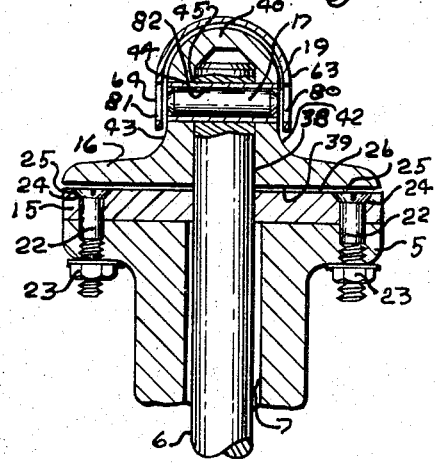
FIG. 3 is a vertical cross-sectional view along lines 3—3 of FIG. 2 showing the valve control mechanism.

The throttle plate 15 is secured to the valve neck flange 5 by means of bolts 22 and nuts 23 as shown in FIG. 3. It will be noted that the heads 24 of the bolts 22 are countersunk in the countersink holes 25 in the upper surface 26 of throttle plate 15. As illustrated in FIG. 5, throttle plate 15 is circular in plan view having a central opening 27 to allow the passage therethrough of the valve stem 6. A series of holes or openings 28 which extend through throttle plate 15 are located in spaced relation to edge 29 of throttle plate 15 and in the illustrated structure, said holes or openings 28 being in overlapping relation and designed to receive the locking pin 21 and to retain said pin 21 and hub 16 against rotational motion caused by a force exerted upon hub 16. The locking pin 21 may be disposed in any one of the overlapping holes 28 to provide a number of settings for the butterfly disc 8 within the valve housing section 2. The series of overlapping holes 28, as illustrated, each have their center points disposed on a 90-degree circular arc whose center point of curvature coincides with the center point of valve stem 6 or the central opening 27 in throttle plate 15 with said center points of the overlapping holes lying in spaced relation from said central opening 27 or valve stem 6 and the outer edge 29 of throttle plate 15. A slot 30 in throttle plate 15 is located in opposed relation to the series of overlapping holes 28 across central opening 27. As illustrated, the center line of slot 30 extends approximately through a 90-degree arc whose center of curvature is the center point of valve stem 6 or the central opening 27 of throttle plate 15. The ends 31 and 32 of the slot 30 cooperate with head 33 of screw 34 in hub 16 to provide a stop means to limit the rotation of hub 16 and the valve stem 6 to approximately a 90-degree arc which will rotate the butterfly disc 8 within the valve housing section 2 from a closed position as shown in FIG. 1 through 90 degrees to an open position. The hub 16 and, in turn, valve stem 6 may therefore be rotated freely within the 90-degree arc of slot 30 being stopped at ends 31 and 32 of said slot 30 and may be locked at various positions between ends 31 and 32 of slot 30 by the insertion of locking pin 21 within any one of the holes of the series of overlapping holes 28 in throttle plate 15.

As illustrated, the hub 16 overlies the upper surface 26 of throttle plate 15 and is slightly spaced from said upper surface 26. The hub may be formed of brass, cast iron or any other suitable material. Handle 35 extends outwardly from hub 16 having its threaded end 36 received in the threaded opening 37 in hub 16. The handle 35 is utilized for grasping by the operator and acts as a lever arm to provide a rotational force to the hub 16 and valve stem 6. The hub 16 has a second opening 38 which extends upwardly in the hub 16 from the bottom surface 39 to a position in spaced relation from the top surface 40 of said hub 16. The valve stem 6 is received in the opening 38 and is secured to the hub 16 at its upper portion 41 by means of a hollow pin 17 which, as shown in FIG. 3, extends from one side 42 of the hub 16 to the opposite side 43 through opening 44 in the hub 16 and opening 45 in the valve stem 6 and being secured therein by conventional means. The hollow pin 17 connects the hub 16 to the valve stem 6 so that a rotation of the hub 16 by force applied to the handle 35 results in a rotation of the valve stem 6. The hollow pin 17 also serves to support the hub 16 in a slightly spaced relation from the top surface 26 of the throttle plate 15 to allow a free rotational motion of the hub 16 in relation to the throttle plate 15.

The hub 16 has a third opening 46 in its bottom surface 39 which is threaded and receives screw 34 whose head portion 33 cooperates with the ends 31 and 32 of the slot 30 in the throttle plate 15 to stop the rotation of the hub 16. The stop member, here illustrated as a screw 34, may take any number of forms as long as some projection exists from the hub 16 to cooperate with the ends 31 and 32 of the slot 30. It should be noted that unlike conventional valve control mechanisms, the stop elements, ends 31 and 32 of slot 30 and screw 34 are housed within the mechanism and not subject to the effects of weathering.

Figure 2:
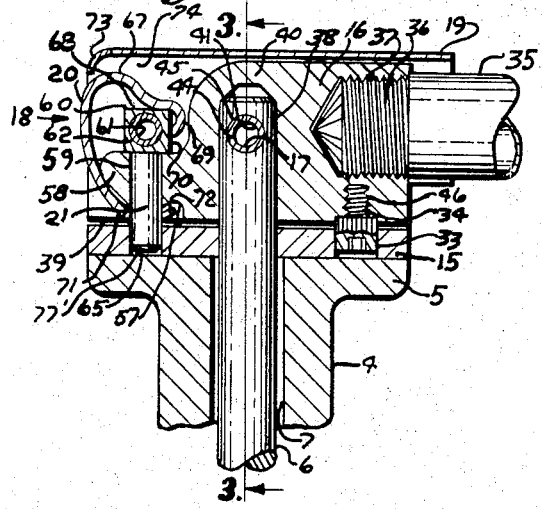
FIG. 2 is a vertical cross-sectional view along lines 2—2, showing the valve control mechanism.

The rearward end portion 47 of the hub 16 opposite the handle 35 is best shown in FIG. 8 where the spring 20 has been removed and a modified form of a locking device substituted. Even though the locking device has been modified, the hub structure 16 is identical to that shown in FIGS. 1 through 4. As illustrated, the hub 16 has a curved portion 48 which curves downwardly toward end portion 47 from the top surface 40 of hub 16. The curved portion 48 terminates at its lower edge 49 in a surface 50. The surface 50 has a central raised portion 51 and two outer marginal surfaces 52 and 53. Two projections 54 and 55 extend outwardly at end 47 from the marginal surfaces 52 and 53 leaving a center recessed portion 56 between said projections 54 and 55. The spring element 20 as shown in FIG. 2 and FIG. 4 is housed within the recessed area or portion 56. As best seen in FIGS. 2 and 4, the recessed portion 56 extends forwardly toward handle 35 beneath the surface 50 having an upturned enlarged portion 57 beneath the surface 50 defining a protruding lip portion 58. The surface 50 is the upper surface of the lip portion 58. An opening 59 is provided through the protruding lip portion 58 for insertion of locking pin 21. The opening 59 in the protruding lip 58 is so positioned that it lies in alignment with any of the holes of the series of overlapping holes 28 of throttle plate 15 to allow the insertion of locking pin 21 through opening 59 and into any of the holes of said series of holes 28.

The locking device 18 for the valve control mechanism 1 is comprised of a lever latch 19, a spring 20 and a locking pin 21.

The pin 21 is slidably mounted in opening 59 in the protruding lip portion 58 of hub 16 with its head 60 lying adjacent the raised portion 51 of surface 50 of hub 16 with a hollow pin 61 extending through a central opening 62 in the rectangular head 60 of locking pin 21 to secure said head 60 and the locking pin 21 to the outer flanges 63 and 64 of the lever latch 19. The shaft portion 65 of the pin 21 extends downwardly from the head 60 through opening 59 in the protruding lip portion 58 and into the holes 28 in the throttle plate 15. As in the case of the stop elements, the locking pin 21 and the series of overlapping holes 28 are housed within the mechanism 1 and not subject to the effects of weathering.

The spring 20 is formed of a strip steel of a generally C-shaped configuration and is disposed in the recessed area 56 between protrusions 54 and 55 of the hub 16. The spring 20 actually seals off the back portion 66 of the valve control mechanism 1 as best shown in FIG. 1. The upper portion 67 of the C-shaped spring 20 extends over the top 68 of the pin head 60 and has a hook portion 69 which is secured to the inside surface 70 of pin head 60. The lower portion 71 of the C-shaped spring 20 extends around the protruding lip portion 58 of hub 16 and into the enlarged upturned opening 57 beneath the surface 50 of hub 16 and is retained therein. The spring 20 has a slot 72 in its lower portion 71 through which the shaft portion 65 of the pin 21 passes. The spring 20 thus straddles pin 21 beneath the protruding lip portion 58 of hub 16. The spring 20 is so positioned as to close the back portion 66 of the control mechanism 1 and to occupy a minimum of space in said mechanism. An existing problem in the art is the space required in a hub structure to house a coil spring which requires some type of counterbore structure. The utilization of a C-shaped flat spring positioned in the manner here shown and described eliminates the necessity of a coil type spring and its associated counter-bore structure enabling the use of smaller hubs.

The lever latch 19 covers the upper surface 40, sides 42 and 43 and part of the rearward portion 47 of hub 16. As illustrated, the lever latch 19 generally conforms to the shape of hub 16 as best seen in FIG. 3. The rearward portion 73 of the lever latch 19, however, lies in spaced relation above the surface 50 of the hub 16 and with the side flanges 63 and 64 and surface 50 of hub 16 defining a chamber 74 in which is housed the upper portion 67 of spring 20 and the pin head 60 of pin 21. The lever latch extends forwardly of rearward portion 73 toward the handle 35 and as shown in FIG. 2, overlies a portion of handle 35. The lever latch 19 has protruding ears 75 on each side thereof to facilitate the lifting of lever latch 19 to unlock hub 16. The side flanges 63 and 64 each have a camming surface 76 at their rearward edges 77 and 79 respectively which lies directly adjacent the surface 50 of hub 16 and in contacting relation thereto.

In order to disengage locking pin 21 from its locked position in any one of the holes of the overlapping series of holes 28, the lever latch 19 is rotated to the position shown in FIG. 4. The lever latch 19 rotates about the hollow pin 61 which is utilized to secure the head 60 of locking pin 21 to side flanges 63 and 64 of the lever latch 19, the camming surface 76 on each of the side flanges 63 and 64 reacts with the surface 50 of hub 16 camming the pin head 60 upwardly and thus withdrawing the lower portion 77′ of the shaft 65 of the locking pin 21 from its locked position within one of the holes of the series of holes 28 of throttle plate 15. It should be noted that the forces of the spring 20 when the latch 19 is rotated upwardly are substantially equal and oppositely applied to protruding lip portion 58 and are not imposed upon the valve stems as in many prior art devices. The reactive forces of the spring 20 are substantially absorbed by the hub 16.

FIG. 2 shows the lower portion 77′ of the shaft 65 of the locking pin 21 disposed in one of the holes of the series of overlapping holes 28 of throttle plate 15. The effect of rotation of the lever latch 19 to an upward position is shown in FIG. 4 which constitutes the unlocked position of the valve control mechanism 1. In this position, the lower portion 77′ of the pin 21 is withdrawn upwardly from engagement with one of the holes of the series of overlapping holes 28 in throttle plate 15. One may now rotate handle 35 which will, in turn, rotate the valve stem 6 and the butterfly disc 8. As an added precaution against accidental displacement of the butterfly disc 8, a spring clip 78 is utilized to prevent lifting of the lever latch 19 to unlock the hub 16. As shown in FIG. 1, the spring clip 78 has a lower leg portion 79′ which extends through openings 80 and 81 of side flanges 63 and 64 respectively and opening 82 in the hollow pin 17. The upper leg portion 83 of spring clip 78 extends over the upper surface 84 of lever latch 19 having a bent portion 85 generally conforming in shape to the upper surface 84 of the lever latch 19 and springingly engaging said upper surface 84. The lever latch 19 may not be rotated upwardly to unlock the valve control mechanism 1 without first removing spring clip 78.

In the embodiment previously discussed, the various angular dispositions of the butterfly disc 8 is limited to the number of holes of the series of overlapping holes 28 in throttle plate 15 as the hub 16 may only be locked in those positions. To obtain infinite throttling service, the modified valve control mechanism 86 is utilized as shown in FIGS. 6, 7 and 8. The throttle plate 87 of the modified form of the valve control mechanism 86 is shown in FIG. 6. The throttle plate 87 differs from the throttle plate 15 in that a slot 88 has been substituted for the series of overlapping holes 28 shown in FIG. 5. Slot 88 as best shown in FIG. 7, is defined by two lip portions 89 and 90 disposed along both edges 91 and 92 respectively of slot 88. The lip portions 89 and 90 are formed by the cutting of a recessed slot 93 in the undersurface 94 of the throttle plate 87 directly beneath slot 88. The recessed slot 93 is of a greater width than slot 88, thus providing the lip portions 89 and 90 at each edge 91 and 92 of slot 88.

Referring to FIG. 7, it will be noted that the locking device 18, as shown in FIGS. 2 and 4, has been omitted. The hub 16 shown in FIGS. 1 through 4, however, is utilized in the modified form of the valve control mechanism 86. A pin 95 is inserted in the opening 59 in hub 16, said pin 95 having an upper shaft portion 96 which is male threaded and engaged by a rosette hand knob nut 97. The lower portion 98 of pin 95 has a head 99 disposed in the recessed slot 93 of throttle plate 87 with the upper surface 100 of head 99 in abutting relation to lip portions 89 and 90 of slot 88. The body portion 101 of pin 95 extends upwardly from the head 99 through slot 88 and into opening 59. When the rosette hand knob nut 97 is loosened, the hub 16 is free to rotate and therefore, the butterfly disc 8 may be rotated to the desired position. When such a position is reached, the rosette hand knob nut 97 is simply tightened providing a clamping action between said nut 97 and the upper surface 100 of the head 99 against hub 16 and throttle plate 87 respectively. Aside from the aforementioned variations in the locking device of the modified form 86 of the valve control mechanism 1, the remainder of said control mechanism 86 is identical to the valve control mechanism 1 shown in FIGS. 1 through 4 and operates in exactly the same manner.

It is to be understood that while I have illustrated and described one form of my invention, it is not to be limited to the specific form or arrangement of parts herein described and shown except insofar as such limitations are included in the claims.

I claim:
1. In a valve having a rotatable control shaft secured to a valve member, a valve control mechanism for rotating and locking said valve member in a desired position comprising:
   (a) a valve casing,
   (b) an axially rotatable control shaft located in said casing and connected to said valve member,
   (c) a rotatable hub to receive the control shaft,
   (d) means to rigidly secure the control shaft to the hub such that rotation of the hub causes rotation of the control shaft, and
   (e) cooperative means on the hub and valve casing to lock the hub in a desired position.

2. A valve control mechanism as recited in claim 1 wherein the means on the hub to lock the hub in the desired position is comprised of:
   (a) a locking pin slidably mounted on the hub having an upper portion and a lower portion, said lower portion engageable with the locking means on the valve casing, and
   (b) means on the hub to engage and disengage the locking pin from said locking means on the valve casing.

3. A valve control mechanism as recited in claim 2 wherein the means on the hub for engaging and disengagin the locking pin from said locking means on the casing is comprised of:
   (a) a C-shaped spring having an upper and lower leg portion with the lower leg portion secured to the hub adjacent the lower portion of the locking pin and the upper leg portion secured to the upper portion of the locking pin, (b) a lever latch rotatably secured to the upper portion of the locking pin, (c) cooperative means on the lever latch and the hub to cam the lever latch and the slidably mounted locking pin in an upward direction upon rotation of the lever latch against the compressional force of the C-shaped spring.

4. A valve control mechanism as recited in claim 2 wherein the upper portion of the locking pin extends upward from the hub and is threaded and a tightening nut attached to said pin to engage and disengage said pin from the locking means on the valve casing.

5. In a valve control mechanism as recited in claim 4 wherein the hub is rotatable about a point of rotation and the locking means on the valve casing to engage the lower portion of the locking pin has a slot therein having edge portions in spaced relation from the center point of rotation of the hub and disposed along a circular arc whose center point of curvature coincides with the point of rotation of said hub, said slot having a lip portion adjacent at least one edge thereof and the locking pin extends through said slot and has a head portion adjacent said lip portion of said slot for locking engagement against said lip portion by tightening of the nut at the threaded upper portion of the locking pin.

6. In a valve control mechanism as recited in claim 1 wherein the hub is rotatable about a point of rotation and the locking means on the valve casing to engage the locking means on the hub has a slot therein having edge portions in spaced relation from the center point of rotation of the hub and disposed along a circular arc whose center point of curvature coincides with the point of rotation of said hub, said slot having a lip portion adjacent at least one edge thereof.

7. In a valve control mechanism as recited in claim 1 wherein the hub is rotatable about a point of rotation and the locking means on the valve casing to engage the locking means on the hub is a series of openings in spaced relation from the center point of rotation of the hub and disposed along a circular arc whose center point of curvature coincides with the point of rotation of the hub, said series of openings being engaged by the locking means on the hub to prevent rotation of the hub.

8. In a valve control handle mechanism as recited in claim 1 wherein the means on the valve casing and the hub have cooperating means acting as stops to prevent excessive rotation of the hub and control shaft.

9. A valve control mechanism on a valve casing for rotating and locking a control shaft comprising:

(a) a hub having a central opening therein for receipt of a control shaft, (b) means on the hub for rigidly securing a control shaft to the hub, (c) a throttle plate mounted on the valve casing and having a central opening to allow passage therethrough of a control shaft and a series of openings in spaced relation from the central opening and disposed along a circular arc about the central opening, and (d) means connected to the hub for releasably engaging any one of the openings of the series of openings of the throttle plate, said means for releasably engaging the openings of the series of openings in the throttle plate includes a locking pin slidably mounted in the hub, and means for disengaging and engaging the locking pin with any of the openings of the series of openings in the throttle plate.

10. A valve control mechanism as recited in claim 9 wherein the means for engaging and disengaging the locking pin and the throttle plate is comprised of:

(a) a C-shaped spring with an upper and lower leg portion with the lower leg portion secured to the hub and the upper leg portion secured to the locking pin, and (b) means secured to the locking pin for engaging and disengaging said pin with any opening of the series of openings in the throttle plate.

11. A valve control mechanism as recited in claim 10 wherein the means for engaging and disengaging the locking pin is comprised of a lever latch rotatably mounted to the locking pin and cooperating means on the lever latch and the hub providing a camming action to disengage the locking pin from any of the openings of the series of openings in the throttle plate and against the compressional force of the C-shaped spring.

12. A valve control mechanism comprising:

(a) a throttle plate on a valve casing having a central opening for passage therethrough of a control shaft and having a series of overlapping holes whose center points lie on a circular arc in spaced relation from the center opening and having the same center point of curvature as the central opening and a slot whose center line lies on a circular arc spaced from said central opening and having the same center point of curvature as said central opening, (b) a rotatable hub associated with the throttle plate and having a central opening aligned with the central opening in the throttle plate for receipt of an axially rotatable control shaft, a stop means connected to the hub and extending from the hub into the slot of the throttle plate to prevent excessive rotation of the hub and a second opening in said hub having a center line in alignment with the center points of each of the overlapping holes in the throttle plate, and (c) locking means on said hub for releasable engagement with the series of overlapping holes in the throttle plate.

13. A valve control mechanism as recited in claim 12 wherein the locking mechanism is comprised of a lever latch, a spring and a locking pin, said lever latch having a camming surface in contact with said hub, a pin secured to the lever latch and extending through the opening in the hub and having a lower portion for engagement in any of the holes of the series of overlapping holes in the throttle plate, a C-shaped spring having an upper and lower leg portion with the lower leg portion being connected to the hub and the upper leg portion secured to the locking pin to resist the unlocking pressure exerted on the locking pin by the action of the camming surface of the lever latch against the hub which acts to lift the locking pin from its engagement with any of the holes of the series of overlapping holes in the throttle plate.

14. In a valve control mechanism, (a) a throttle plate on a valve casing having a central opening for passage therethrough of a control shaft and having a first slot with an edge portion therein whose center line lies on a circular arc in spaced relation from the central opening and having the same center of curvature as the central opening and having a lip portion on at least one edge of said first slot and having a second slot whose center line lies on a circular arc in spaced relation to the central opening and having the same center point of curvature as the central opening, (b) a rotatable hub in associated relation to the throttle plate and having a central opening in alignment with the central opening of the throttle plate for receipt of an axially rotatable control shaft, a stop means connected to said hub which extends into the second slot of the throttle plate to prevent excessive rotation of said hub and an opening in said hub in alignment with the first slot in the throttle plate, and (c) means on said hub cooperating with the first slot of the throttle plate to lock said hub in a desired position.

15. A valve control mehcanism as recited in claim 14 wherein the locking means is comprised of a locking pin having an upper and lower portion, the lower portion having a head which underlies the lip portion of the slot in the throttle plate with the upper portion being threaded, said pin extending through the slot in the throttle plate and through the second opening in the hub and a locking nut secured to the threaded upper portion of said pin to clampingly engage the headed lower portion of the locking pin against the lip portion of the slot in the throttle plate to thereby lock the hub in a desired position.

References Cited

UNITED STATES PATENTS

| | | | |
|---|---|---|---|
| 620,124 | 2/1899 | Hassis | 74—528 X |
| 628,884 | 7/1899 | Deutsch | 251—110 X |
| 961,466 | 6/1910 | Shade | 251—109 X |

FRED C. MATTERN, Jr., *Primary Examiner.*

W. S. RATLIFF, *Assistant Examiner.*